United States Patent
Li

(10) Patent No.: US 9,965,356 B2
(45) Date of Patent: May 8, 2018

(54) METHOD AND SYSTEM OF HIGH-AVAILABILITY PCIE SSD WITH SOFTWARE-HARDWARE JOINTLY ASSISTED IMPLEMENTATION TO ENHANCE IMMUNITY ON MULTI-CELL UPSET

(71) Applicant: Alibaba Group Holding Limited, George Town (KY)

(72) Inventor: Shu Li, Bothell, WA (US)

(73) Assignee: Alibaba Group Holding Limited (KY)

( * ) Notice: Subject to any disclaimer, the term of this patent is extended or adjusted under 35 U.S.C. 154(b) by 82 days.

(21) Appl. No.: 15/256,350

(22) Filed: Sep. 2, 2016

(65) Prior Publication Data

US 2018/0067810 A1    Mar. 8, 2018

(51) Int. Cl.
*G06F 11/14* (2006.01)

(52) U.S. Cl.
CPC ...... *G06F 11/142* (2013.01); *G06F 2201/805* (2013.01); *G06F 2201/85* (2013.01)

(58) Field of Classification Search
CPC .......................... G06F 11/142; G06F 2201/85
See application file for complete search history.

(56) References Cited

U.S. PATENT DOCUMENTS

| | | |
|---|---|---|
| 6,301,696 B1 | 10/2001 | Lien et al. |
| 6,526,557 B1 | 2/2003 | Young et al. |
| 6,838,899 B2 * | 1/2005 | Plants ................ G06F 11/1008 326/10 |
| 7,036,059 B1 | 4/2006 | Carmichael et al. |
| 7,576,557 B1 * | 8/2009 | Tseng ............... H03K 19/17752 326/14 |
| 8,099,625 B1 * | 1/2012 | Tseng .................. G06F 11/2017 703/21 |
| 2016/0139811 A1 * | 5/2016 | Ikeuchi ........... H03K 19/17752 711/170 |

FOREIGN PATENT DOCUMENTS

| | | | |
|---|---|---|---|
| CN | 103500125 | 1/2014 | |
| WO | WO-2014199678 A1 * | 12/2014 | ....... H03K 19/17752 |

OTHER PUBLICATIONS

Lützel S. and Siemers C.; "A Novel Soft Error Mitigation Approach for SRAM-based FPGAs;" InWorld Automation Congress (WAC), IEEE, Jun. 24, 2012, pp. 1-6.*

* cited by examiner

*Primary Examiner* — Joseph R Kudirka
(74) *Attorney, Agent, or Firm* — Van Pelt, Yi & James LLP

(57) ABSTRACT

It is detected that an error has occurred on an FPGA while the FPGA is operating in a first mode, wherein the error is not correctable by the FPGA itself. The FPGA is configurable to operate in the first mode in which a set of processing steps is to be performed by a first set of logic cells within the FPGA, or in a second mode in which at least a portion of the set of processing steps is to be performed outside the FPGA enabled by a second set of logic cells within the FPGA. An error location associated with the error is identified. In the event that the error location is deemed to have occurred in a critical subset of the first set of logic cells: the FPGA is switched to operate in the second mode; at least one of the first set of logic cells is reconfigured; and upon successful reconfiguration, the FPGA is switched to operate in the first mode.

23 Claims, 6 Drawing Sheets

METHOD AND SYSTEM OF HIGH-AVAILABILITY PCIE SSD WITH SOFTWARE-HARDWARE JOINTLY ASSISTED IMPLEMENTATION TO ENHANCE IMMUNITY ON MULTI-CELL UPSET

BACKGROUND OF THE INVENTION

Computer data centers operate with increasingly high rack density. More electronic devices work together such that a large amount of integrated circuits are in close proximity with each other and may strongly interfere with each other.

Integrated circuits are solid state devices that while typically reliable in a personal computer, when in close proximity to other devices may malfunction due to an upset. A single event upset (SEU) may be caused by at least one of three sources: alpha particles, high energy neutrons, and thermal neutrons. Modern data center systems thus build in protection including error-correcting coding (ECC) and interleaving to combat single upsets, but may still be vulnerable to multiple upsets.

BRIEF DESCRIPTION OF THE DRAWINGS

Various embodiments of the invention are disclosed in the following detailed description and the accompanying drawings.

DETAILED DESCRIPTION

Figure 1:
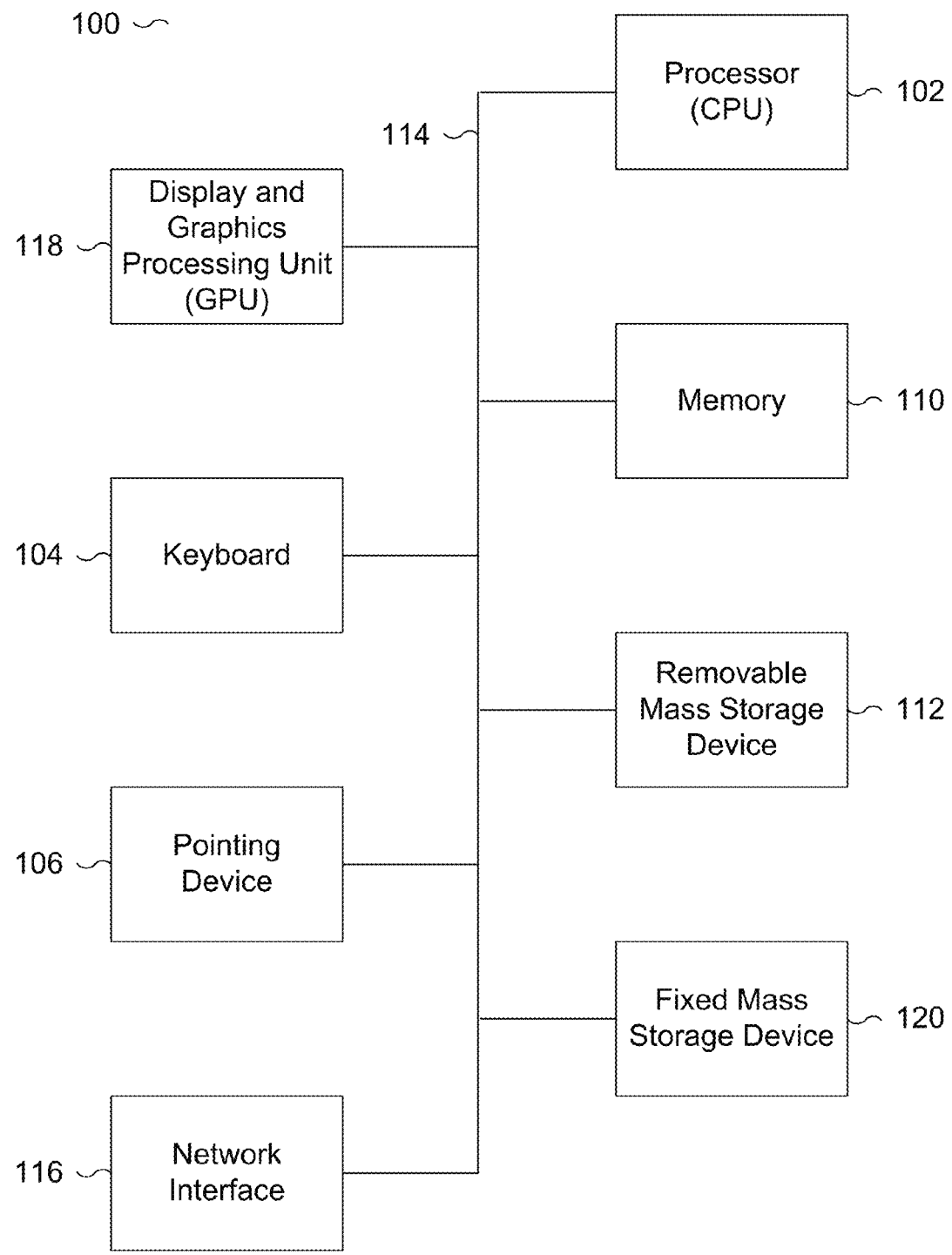
FIG. 1 is a functional diagram illustrating a programmed computer system/server for a computer data center in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A high-availability solid state device with a joint software-hardware implementation to enhance immunity on multi-cell upset is disclosed. In one embodiment, the high-availability solid state device is a PCI Express solid state drive (SSD) such as those found in data centers.

A field programmable gate array (FPGA) is used for a joint hardware-software approach. The FPGA is configured to operate in one of at least two modes: a normal mode wherein the FPGA processes data in 'hardware,' using one or more of processing steps, for example, using a CRC codec, ECC codec, interleaver, and/or RAID; and a direct mode that allows data to bypass one or more processing steps. In the direct mode the processing steps may be performed instead by 'software' or any other device outside of the FPGA.

While the FPGA is operating in the normal mode, the FPGA is configured to detect that if an upset has occurred on the FPGA, and if the upset is not correctable by the FPGA itself, it may identify an error location associated with the upset.

In the event that the error location is within a critical subset of logic cells, it will switch the FPGA to operate in the direct mode. This will allow processing to happen with the assistance of an external CPU, GPU, and/or a peer FPGA while the FPGA reconfigures at least some of the logic cells. When the logic cells have been successfully reconfigured, the FPGA switches back to normal mode.

Upsets

Single event upsets (SEU) are mainly caused by one of at least three sources: alpha particles, high energy neutrons, and thermal neutrons. Alpha particles may have a kinetic energy of up to 10 MeV, and their penetration on an IC ranges up to 70 um, wherein 1 MeV of energy may generate 44 fC of charge. Modern advanced IC technology continues to scale down circuit pitch, with the consequence that charge required to store each bit is reduced. Thus, as circuit pitch is scaled down, the probability of charge flipping bits from 1 to 0 due to alpha particles increases.

Similarly, when neutrons possessing sufficient energy hit a corresponding transistor junction, the circuit content may be affected too. High-energy neutrons are the by-product of cosmic rays hitting earth's atmosphere and may have a broad energy spectra. The flux of high energy neutrons is highly dependent on altitude and geomagnetic locations. The higher the altitude, the stronger the neutrons' flux may be.

When high energy neutrons lose energy due to the surrounding material, they may become thermal neutrons. Characteristic energy of thermal neutrons remains around 25 meV which may still affect ICs adversely. Generally, the thermal neutrons' flux depends on its associated high energy neutron background and surrounding environment, and typically remains 0.1 to 0.5 times that of the associated high energy neutron flux.

ICs fundamentally depend from transistors that switch on and off, and each transistor holds a tiny amount of charge. An example IC is that of SRAM with its regular structure. Two back-to-back inverters are balanced to latch one bit. When a word line is selected, the bit line is turned on or off according to the charge at the junction. However, if a particle like a neutron or alpha particle hits the junction, the original charge may be changed, which correspondingly modifies the formerly stored bit, and is considered a single event upset.

SRAM is broadly used in VLSI circuits, as used in computer data centers. A plurality of single error upsets which simultaneously happen is termed a multi-cell upset (MCU). The probability of MCU is non-trivial with advances in microelectronics technology and aggressive shrinking of feature size, and higher demand for enterprise data centers. The consequences of MCU include service interruption, infrastructure maintenance difficulty, drive failure, and TCO expense growth. Traditionally, methods to detect and correct a single cell's malfunction include the use of cyclic redundancy code (CRC), parity check, Hamming codes, and so forth. Similar to error coding in general, these methods may prove insufficient at solving multi-cell upset.

Generally for cost and performance improvements, the feature size of Very Large Scale Integration (VLSI) circuits keeps reducing, resulting in the number of SRAM cells within a given area increasing. The statistical probability of multi-cell upset versus single event upset increases as design rule decreases for improved fabrication technologies. Thus as technology improves, the chance of MCUs increases given the same probability of an SEU. To maintain high availability, including the effectiveness and efficiency of the smaller design rule IC, the joint software-hardware solution embodiment may improve an FPGA's resistance to an MCU.

VLSI circuit manufacturers design proprietary protection including ECC and interleaving, and consequently, reduce the effects of SEU. With the increased demand on data centers from innovations such as cloud computing, data center equipment is required to improve with a higher reliability standard. With hyperscale cloud providers providing services on critical customer data, corresponding liability cannot rely on consumer-grade electronics as may have been done traditionally. Improving a device such as a PCIe SSD by improving reliability, stability, high availability, and/or uninterrupted service metrics using an FPGA to mitigate MCU is disclosed.

FIG. 1 is a functional diagram illustrating a programmed computer system/server for a computer data center in accordance with some embodiments. As shown, FIG. 1 provides a functional diagram of a general purpose computer system programmed to provide data usage and storage services in accordance with some embodiments. As will be apparent, other computer system architectures and configurations can be used for data usage and storage services.

Computer system 100, which includes various subsystems as described below, includes at least one microprocessor subsystem, also referred to as a processor or a central processing unit ("CPU") 102. For example, processor 102 can be implemented by a single-chip processor or by multiple cores and/or processors. In some embodiments, processor 102 is a general purpose digital processor that controls the operation of the computer system 100. Using instructions retrieved from memory 110, the processor 102 controls the reception and manipulation of input data, and the output and display of data on output devices, for example, display and graphics processing unit (GPU) 118. Examples of GPUs include modern graphics card adapters capable of general-purpose computing on graphics processing units ("GPGPU"), for example, adapters implementing OpenCL, OpenACC, OpenHMPP, CUDA, DirectCompute, PhysX, and Stream.

Processor 102 is coupled bi-directionally with memory 110, which can include a first primary storage, typically a random access memory ("RAM"), and a second primary storage area, typically a read-only memory ("ROM"). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as is well known in the art, primary storage typically includes basic operating instructions, program code, data, and objects used by the processor 102 to perform its functions, for example, programmed instructions. For example, memory 110 can include any suitable computer-readable storage media, described below, depending on whether, for example, data access needs to be bi-directional or uni-directional. For example, processor 102 can also directly and very rapidly retrieve and store frequently needed data in a cache memory, not shown. The processor 102 may also include a coprocessor (not shown) as a supplemental processing component to aid the processor and/or memory 110.

A removable mass storage device 112 provides additional data storage capacity for the computer system 100, and is coupled either bi-directionally (read/write) or uni-directionally (read only) to processor 102. For example, storage 112 can also include computer-readable media such as magnetic tape, flash memory, PC-CARDS, portable mass storage devices, holographic storage devices, and other storage devices. A fixed mass storage 120 can also, for example, provide additional data storage capacity. The most common example of mass storage 120 is a hard-disk drive. In one embodiment, mass storage 120 is a solid-state drive connected by a PCIe bus 114 with an FPGA controller. Mass storages 112, 120 generally store additional programming instructions, data, and the like that typically are not in active use by the processor 102. It will be appreciated that the information retained within mass storages 112, 120 can be incorporated, if needed, in standard fashion as part of memory 110, for example RAM, as virtual memory.

In addition to providing processor 102 access to storage subsystems, bus 114 can be used to provide access to other subsystems and devices as well. As shown, these can include a display monitor 118, a network interface 116, a keyboard 104, and a pointing device 106, as well as an auxiliary input/output device interface, a sound card, speakers, and other subsystems as needed. For example, the pointing device 106 can be a mouse, stylus, track ball, or tablet, and is useful for interacting with a graphical user interface.

The network interface 116 allows processor 102 to be coupled to another computer, computer network, or telecommunications network using a network connection as shown. For example, through the network interface 116, the processor 102 can receive information, for example, data objects or program instructions, from another network, or output information to another network in the course of performing method/process steps. Information, often represented as a sequence of instructions to be executed on a processor, can be received from and outputted to another network. An interface card or similar device and appropriate software implemented by, for example, executed/performed on, processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Throughout this specification "network" refers to any interconnection between computer components including the Internet, Ethernet, intranet, local-area network ("LAN"), home-area network ("HAN"), serial connection, parallel connection, wide-area network ("WAN"), Fibre Channel, PCI/PCI-X, AGP, VLbus, PCI Express, Expresscard, Infiniband, ACCESS.bus, Wireless LAN, WiFi, HomePNA, Optical Fibre, G.hn, infrared network, satellite network, microwave network, cellular network, virtual private network ("VPN"), Universal Serial Bus ("USB"), FireWire, Serial ATA, 1-Wire, UNI/O, or any form of connecting homogenous, heterogeneous systems and/or groups of systems together. Additional mass storage devices, not shown, can also be connected to processor 102 through network interface 116.

An auxiliary I/O device interface, not shown, can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits ("ASIC"s), programmable logic devices ("PLD"s), and ROM and RAM devices. Examples of program code include both machine code, as produced, for example, by a compiler, or files containing higher level code, for example a script, that can be executed using an interpreter.

The computer system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized.

Figure 2:
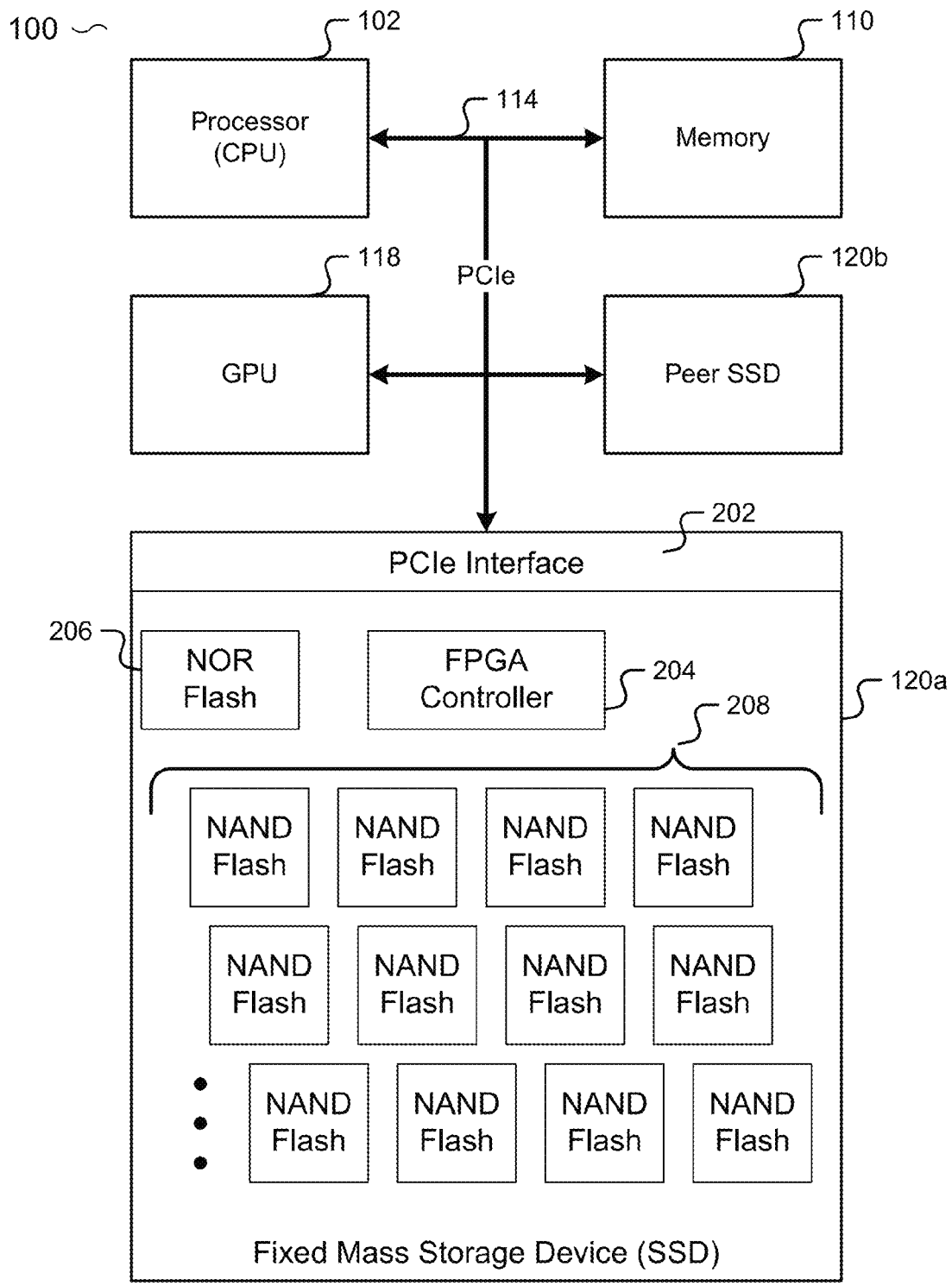
FIG. 2 is a block diagram illustrating an embodiment of a system for a joint high-availability PCIe SSD.

FIG. 2 is a block diagram illustrating an embodiment of a system for a joint high-availability PCIe SSD. In one embodiment, the fixed mass storage device (120) of FIG. 1 is shown in FIG. 2. Two PCIe SSDs are depicted in FIG. 2, a first PCIe SSD (120a) and a similar and/or peer PCIe SSD (120b), collectively referenced as PCIe SSD (120).

Each PCIe SSD (120) comprises a PCIe hardware interface (202), coupled to an FPGA controller (204). The FPGA controller's configuration information is stored in NOR flash (206) for periodic download into the FPGA, and the FPGA controller (204) primarily controls a bank of NAND flash nodes/matrix (208).

In one embodiment, the architecture depicted in FIG. 2 uses host-side flash translation layer (FTL) and control logic, such that the CPU (102) and/or system memory (110) execute those SSD controller functions. The remainder of typical SSD controller functions, such as CRC checks, ECC, and RAID, are implemented in the FPGA (204) on the PCIe card (120).

As compared with an ASIC, the FPGA (204) is a reprogrammable device that is field reconfigurable, such that its function may be disabled and/or degraded if any cell that keeps its configuration information is distorted. An FPGA's atomic element is a logic cell which mainly consists of a look up table (LUT), and mux. The LUT is configured with SRAM vulnerable to upset including SEU and MCU. If configuration of SRAM in an FPGA (204) gets corrupted due to, for example, neutron or alpha particles, the affected logic circuit in FPGA (204) may not deliver the expected function. The whole PCIe SSD (120) may thus malfunction due to incorrect controller logic. While FPGA vendors such as Xilinx, Altera, Lattice, and so forth provide SEU resilience in their SRAM, they are more vulnerable to MCU. In one embodiment, the NOR flash (206) is more resilient to upset including MCU than the SRAM within FPGA controller (204).

Reducing the negative effects of SRAM upset and subsequent configuration information distortion within FPGA (204) on PCIe SSD (120a) involves two parts: first, a location of distorted configuration is identified using an MCU identification subsystem; and second, a software implementation of existing functions in FPGA (204) is run instead on CPU (102), GPU (118), and/or peer PCIe SSD (120b) without interrupting running applications, while the reconfiguration of the FPGA (204) is impelled for the identified location in the background. In one embodiment, reconfiguration takes around 300 ms to accomplish recovery.

Figure 3:
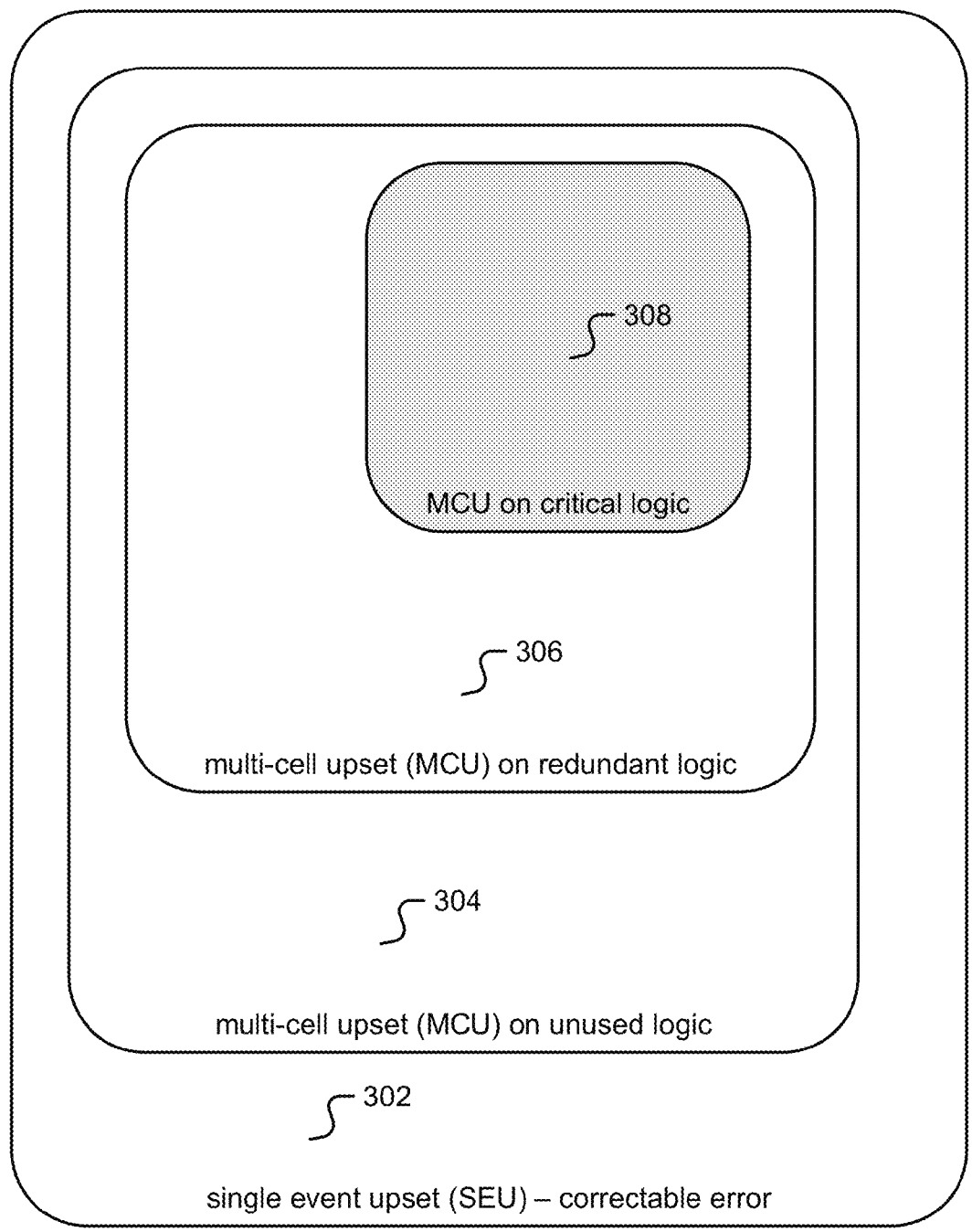
FIG. 3 is an illustration of categorization for an MCU identification subsystem.

FIG. 3 is an illustration of categorization for an MCU identification subsystem. An MCU identification subsystem starting premise is that while logic cells of an FPGA (204) have a uniform probability of incurring an MCU, the impact of an MCU varies based on the location of the affected cells. For many FPGA (204) controller designs, the FPGA logic resource capacity is not fully used and much lower than 100%. The subsystem also takes into account redundant FPGA design wherein certain logic cells used for critical functions are mirrored to provide already-configured redundancy on important modules. Therefore, instead of a typical uncorrectable error (UE) flag and/or bit to cover an entire FPGA (204), an error identification and evaluation subsystem determines the locations where the SEU and/or MCU occurs. This subsystem categorizes the MCU into groups as depicted in FIG. 3.

If an upset is categorized as an SEU (302), it is correctable and does not directly affect the function of FPGA (204). In one embodiment, a log is made of each upset including SEUs for strategic and/or environmental analysis.

If an upset occurs on an MCU and is on the unused and/or redundant logic cells (304, 306), it also does not directly affect the working function. In the event the upset is located on an unused logic cell (304), the MCU can be ignored and/or only logged as there is no requirement for logic and any configuration is irrelevant. In the event the upset is on redundant cells (306), while function continues as normal and without interruption, a background task is made to refresh the redundant cell configuration back to the correct version.

Depending on the FPGA vendor and architecture, refreshing may itself take down most access to the logic fabric of the FPGA while reconfiguration occurs, for example for 300 ms. In one embodiment, the background task is queued so that in the event an MCU occurs on specific portions of the FPGA (e.g., critical logic), the portion on which the error occurred and the above-mentioned redundant logic are both reconfigured in a single reconfiguration session to minimize downtime and/or time in the switched software mode.

In the event an MCU occurs on critical logic (308) that has either no redundant logic and/or already-distorted redundant logic, this error is considered an uncorrectable error (UE), and the joint software-hardware assistance offloads the running service by switching FPGA from normal mode to direct mode and in the background triggering reconfiguration of the FPGA to recover back to normal mode. A summary is given in the table below.

| | Upset Type and Location | Correspondence |
|---|---|---|
| (302) | SEU, any location | Log event |
| (304) | MCU, unused logic | Log event |
| (306) | MCU, redundant logic | Log event, no impact on usage, only reconfig the redundant design in background and/or next reconfiguration of FPGA. Replace the affected circuit module with the redundant modules |
| (308) | MCU, critical logic (UE) | Enter joint software-hardware assistance, the FPGA enters direct mode. |

Figure 4:
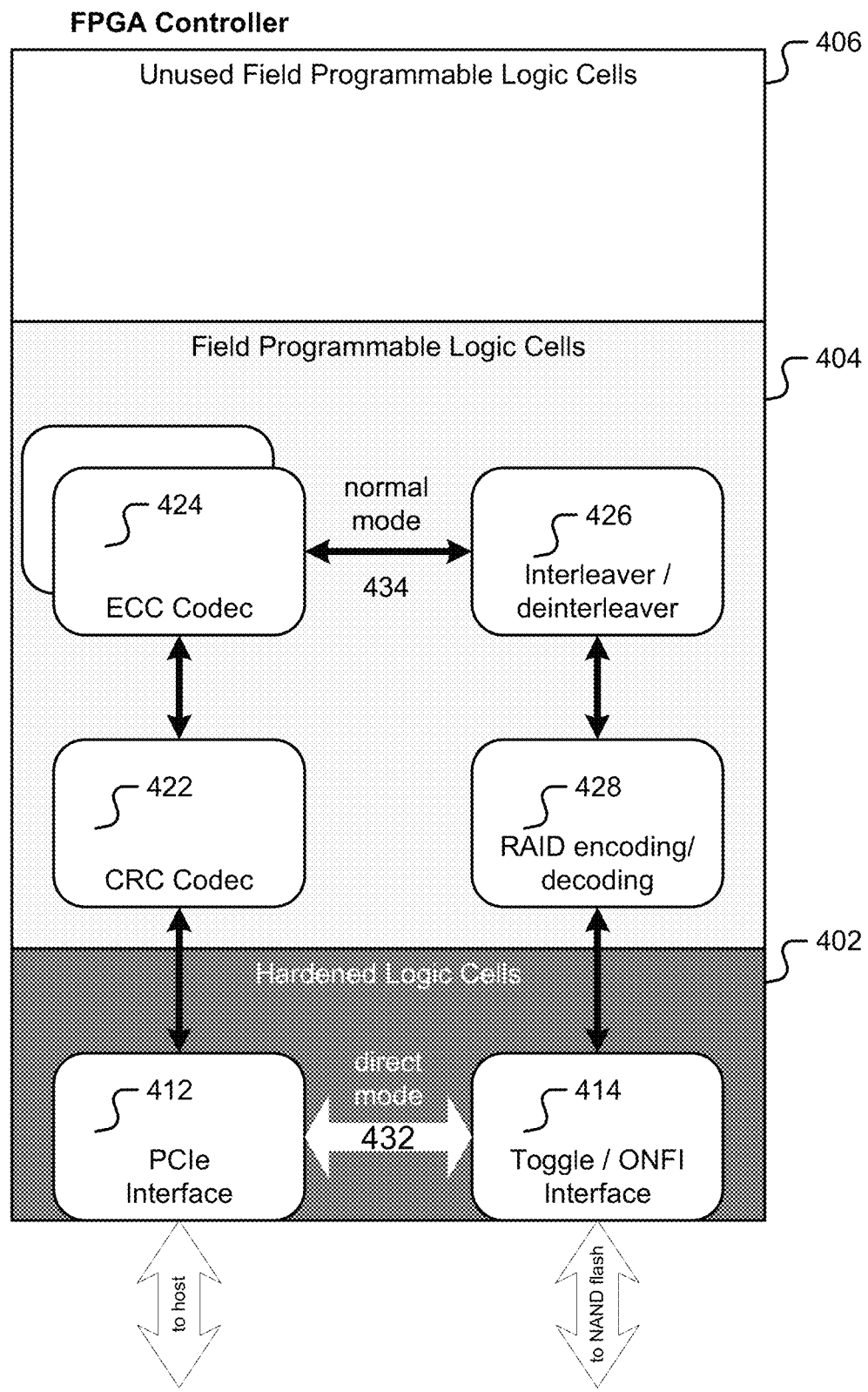
FIG. 4 is a block diagram illustrating an embodiment of a system for joint software-hardware assistance.

FIG. 4 is a block diagram illustrating an embodiment of a system for joint software-hardware assistance. In one embodiment, the FPGA (204) of FIG. 2 is depicted in FIG. 4 as a set of modules and data flow.

Normal mode is the nominal state of the FPGA (204), wherein the FPGA functions in a normal operating state without MCU. As shown in FIG. 3, when an MCU happens in critical logic, certain functions in the data path of normal mode may malfunction. As a result, it may no longer be reliable to use the circuits implemented within FPGA (204). The FPGA (204) thus switches to a direct mode within which the logic modules implemented in FPGA (204) that may be affected by MCU are bypassed, and consequently, the effects of MCU are minimized. In direct mode, implementation of the normal mode functions is offloaded to other resources outside the FPGA (204) such that data input to the FPGA (204) is in a finished and/or processed format ready to be written into NAND flash.

In FIG. 4, there are three classes of logic cells within FPGA (204). Hardened logic cells (402) are logic cells that are programmable hardened. An FPGA vendor may provide a way to "hard code" logic cells within some of the FPGA such that they cannot be field reconfigured and thus are less vulnerable to SRAM corruption or reconfiguration downtime, for example, Xilinx EasyPath, Altera HardCopy, and/or Actel/Microsemi antifuse or other one-time programmable logic fabric. The rest of the FPGA (204) comprises field programmable logic cells that are used for logic, for example, control path and/or data path logic (404), and unused field programmable logic cells (406).

Within hardened logic cells (402), there are at least two interfaces: a PCIe interface (412) block to provide an endpoint/PHY core to interconnect FPGA (204) with the PCIe hardware interface (202); and a NAND flash interface (414) block to provide an endpoint/PHY core to interconnect FPGA (204) with the NAND flash matrix (208). In one embodiment, the NAND flash interface (414) complies with one or more of the following: the Open NAND Flash Interface (ONFI) specification including ONFI 1.0, ONFI 2.0, ONFI 2.1, ONFI 2.2, ONFI 2.3, ONFI 3.0, ONFI 3.1, ONFI 3.2, and/or ONFI 4.0; and Toggle Mode 1.0 and/or Toggle Mode 2.0. Thus within Direct Mode (432) the data path allows a host direct access to the NAND flash (208) by, in order:

a. Starting with the PCIe host (202);
b. Passing through PCIe interface (412);
c. Passing through Toggle/ONFI interface (414); and
d. Ending at NAND flash (208) for a write, and a reverse path for reads.

Within the used field programmable logic cells (404), there are the processing blocks used in Normal Mode (434). In the example shown in FIG. 4, four processing blocks are shown including a CRC codec (422), ECC codec (424), an interleaver (426), and RAID processing (428). Thus within Normal Mode (434) the data path allows a host indirect access to the NAND flash (208) by:

a. Starting with the PCIe host (202);
b. Passing through PCIe interface (412);
c. Processing by CRC codec (422);
d. Processing by ECC codec (424);
e. Processing by Interleaver (426);
f. Processing by RAID (428);
g. Passing through Toggle/ONFI interface (414); and
h. Ending at NAND flash (208) for a write, with a similar reverse path for reads.

At Least Three External Sources of Software Assistance

When in Direct Mode (432), data path functionality for the FPGA (204), for example processing (422,424,426,428), needs to be implemented by an external source while the FPGA (204) is reconfigured, which may take around 300 ms in some embodiments.

As shown in FIG. 2, there are at least three possible sources for assistance: the CPU (102); the peer SSD (120b); and the GPU (118). Any one or combination of the three is assigned to temporarily carry out the functionality of the processing blocks (422,424,426,428) while the PCIe SSD (120a) runs an internal reconfiguration to reprogram FPGA (204) from the NOR flash (206). With the external assistance, service is seamless and continuous to the user.

CPU. A software implementation of the CRC (422), ECC (424), interleaver (426) and RAID (428) is developed, installed, and run on CPU (102) and server memory (110). With an inherent architectural difference between a highly parallel FPGA (204) and Von Neumann CPU (102), codec algorithms may be adjusted, for example by increasing parallelism in an ECC codec algorithm, to maintain required throughput.

Thus, a short-term burden for the general purpose CPU (102) allows diversity over time to avoid a high-capacity PCIe SSD (120a) becoming temporarily unrecoverable, that is, to avoid requiring the whole server/rack to be powered off, replacing the PCIe SSD, and restarting the server as per typical data center operation regulations. Such a process takes tens of minutes or hours because of the manual nature of the work.

Peer SSD. In the event multiple PCIe SSDs are installed on bus (114), they are configured such that they are able to serve as backups for each other, in part because processing resources (422,424,426,428) may not always be in constant use. Each PCIe SSD (120a, 120b) may have the same FPGA (204) design. When one PCIe SSD (120a) is in the FPGA reconfiguration process due to an MCU, it switches to Direct Mode (432), and protocol allows it to "borrow" another (120b) PCIe SSDs's FPGA resource and time slice to accomplish its logic processing in Normal Mode.

This backup mechanism provides high availability and covers the transition for short-term reconfiguration. After the (120a) PCIe SSD's FPGA has completed reprogramming and is verified, the SSD (120a) switches back to Normal Mode (434) and stops borrowing from SSD (120b). As opposed to the CPU, because the logic circuits are identical in both SSDs (120a, 120b), algorithms may not need to be adjusted but a time slice protocol for sharing is developed to prevent collision.

GPU. A third option is to run the software version of the FPGA logic circuits (422,424,426,428) on a GPU co-processor (118). In the write path, the GPU (118) may accomplish the CRC decoding (422), ECC encoding (424), interleaving (426), and RAID encoding (428) with its high-performance computation engines. In the read path, processing like RAID decoding (428), deinterleaving (426), ECC decoding (424) and CRC decoding (422) are also characterized as computationally intensive and carried out by the GPU (118). This option is similar to a CPU (102) option, with the main difference being the computation engine being from the highly parallelized GPU (118) allowing for less adjustment in algorithms, and an alternate time slice arrangement from a GPU (118) idle slot. In one embodiment, a GPU (118) is included in every server to provide a simple off-the-shelf computing resource backup for the CPU (102).

The server and CPU (102) support all three options for software assistance, with top-level management software to arrange for resource borrowing and temporarily substitution and diversion of the data path. This management tool automatically assesses a server infrastructure as shown in FIG. 1 and chooses which option at which time to use to provide as Direct Mode (432) to/from the reconfiguring FPGA (204) to make time for FPGA (204) recovery.

Figure 5:
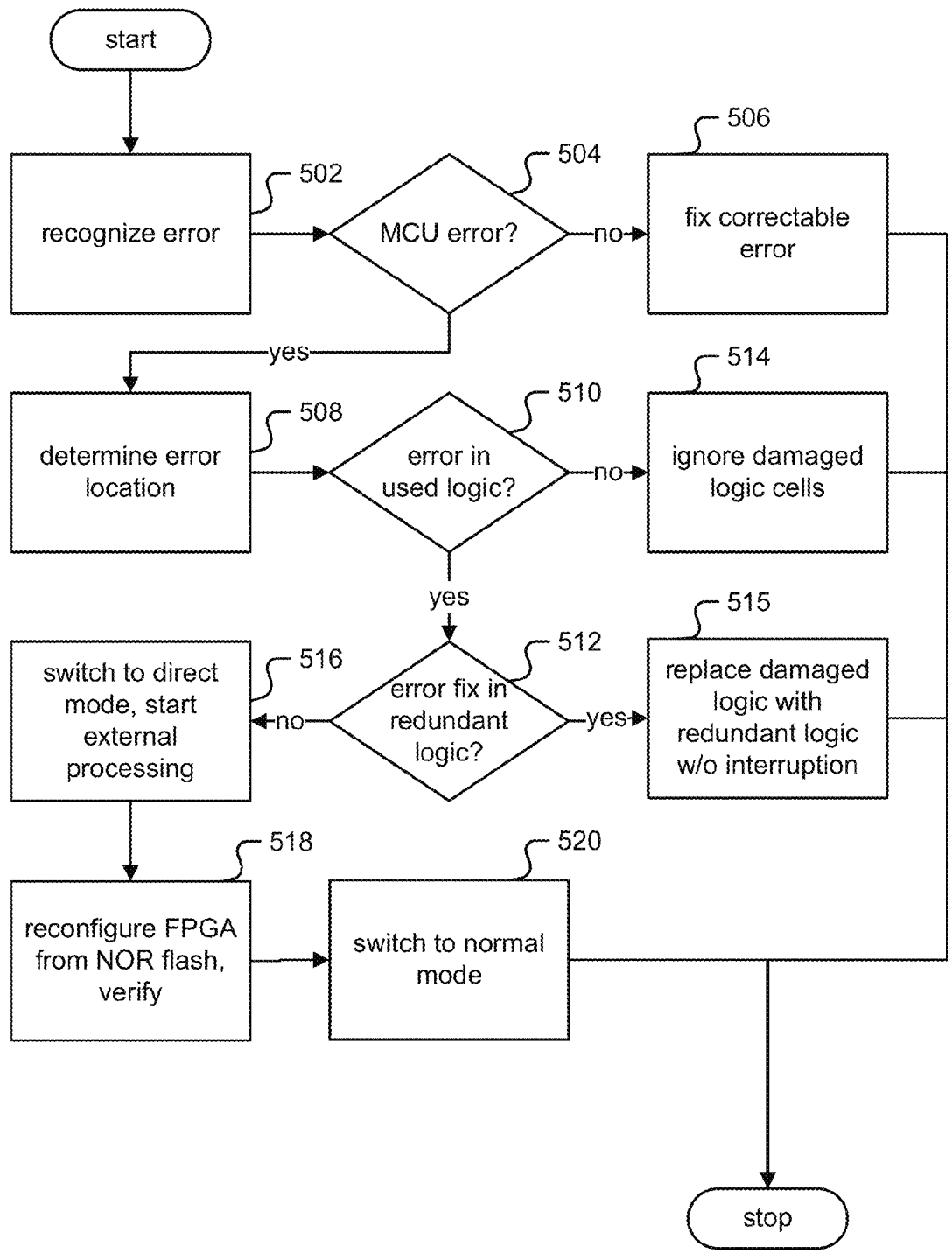
FIG. 5 is a flow chart illustrating an embodiment of a process for handling MCUs.

FIG. 5 is a flow chart illustrating an embodiment of a process for handling MCUs. In one embodiment, the flow of FIG. 5 is carried out by CPU (102) in FIG. 1 using top-level management software.

In 502, an upset and/or error is recognized, primarily by the FPGA vendor's proprietary protocols. An upset may be one or more of an SEU or MCU. If it is determined in 504 that the upset is not an MCU, the error is considered an SEU and fixable as shown in 506.

Otherwise, control is transferred to 508 to determine the error location. The FPGA (204) is designed in its configurable logic cell space (404) to deliberately modularize logic blocks and provide error checks and/or signatures for each submodule. Throughout this specification, a signature that includes a hash value is discussed for purposes of example. For example, the signature can be a parity bit, a CRC, or an ECC syndrome based on the contents of the configuration SRAM contents of one or more logic cells in an FPGA submodule. Other types of signatures can be used. The error checks can be a parity check, a CRC check, an ECC syndrome check, or other appropriate error correction and/or checking techniques.

The FPGA (204) is also designed to provide a hierarchical signaling to quickly determine which submodule has been corrupted due to an MCU, for example by using a 4-bit line to cover each of the four major modules (422,424,426,428) that each would be asserted with at least a bitwise flag if any submodule in the corresponding modules was bad, followed by a series of n-bit lines for each of the four modules to indicate submodules, and/or sub-submodules and so forth.

If it is determined in 510 that the error occurred in logic cells that are being used (404), then control is passed to 512. Otherwise, the error is in the unused logic cells and therefore is ignored as shown in 514. In 512, the location of the upset is determined to see whether it is in the redundant logic. If the upset is in redundant logic, damaged logic is eventually replaced with redundant logic without interruption to the Normal Mode (434) as shown in 515. Otherwise, control is transferred to 516.

In 516, the FPGA (204) is switched into Direct Mode (432) and external processing/software assistance commences from at least one of three sources as described earlier. In 518, after establishing Direct Mode (432), the field programmable logic cells (404) in the FPGA (204) are reconfigured from the NOR flash (206) and then verified. After a successfully verified reconfiguration, the FPGA (204) is switched back into Normal Mode (434) in 520.

Figure 6:
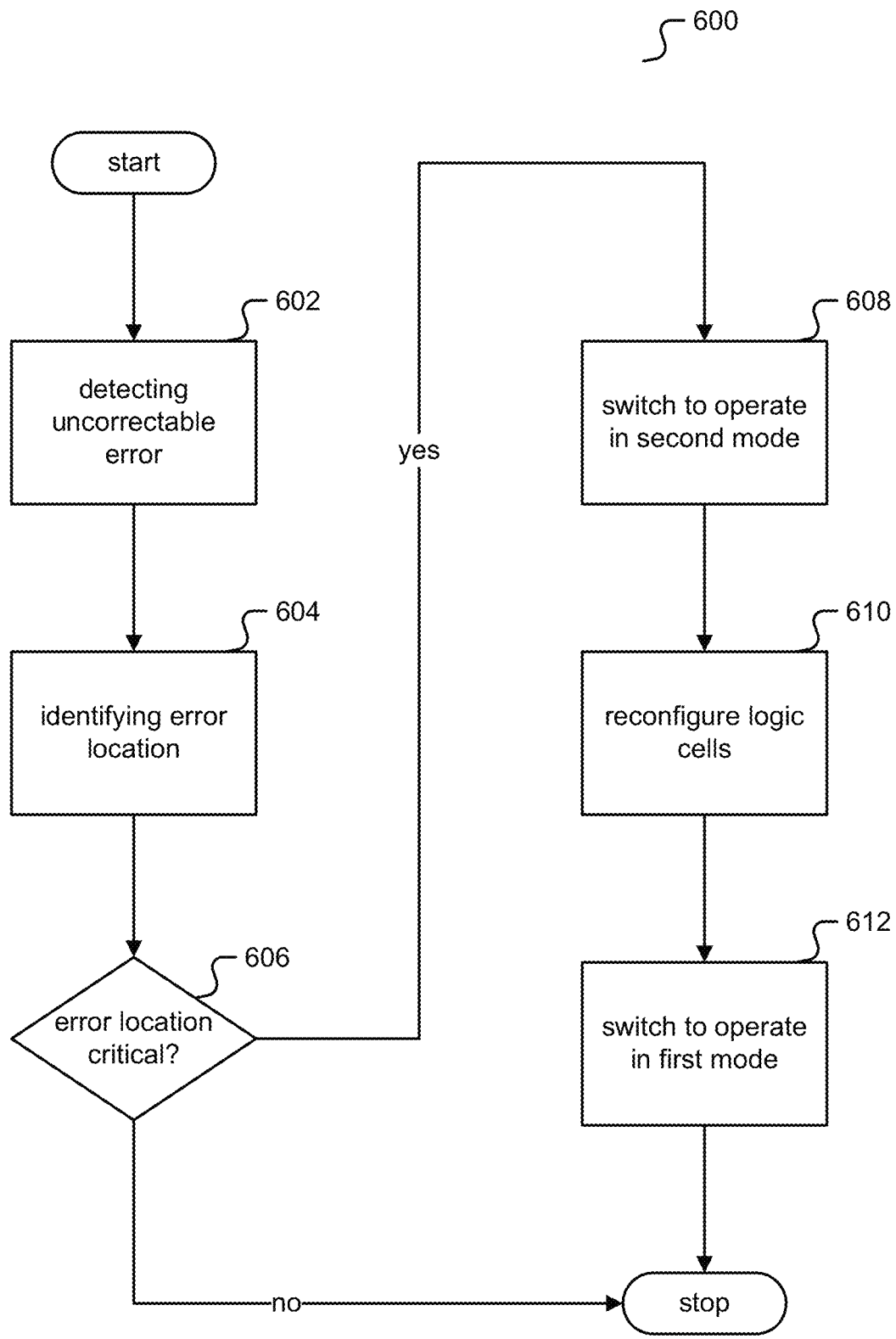
FIG. 6 is a flow chart illustrating an embodiment of a process for joint hardware-software assistance.

FIG. 6 is a flow chart illustrating an embodiment of a process for joint hardware-software assistance. In one embodiment, process 600 can be carried out by the server in FIG. 1 and/or FIG. 2.

In 602, the server detects that an error has occurred on an FPGA (204) while the FPGA is operating in a first mode (e.g., Normal Mode 434), wherein the error is not correctable by the FPGA itself. The FPGA is configurable to operate in the first mode in which a set of processing steps is to be performed by a first set of logic cells within the FPGA, or in a second mode (e.g., Direct Mode 432) in which at least a portion of the set of processing steps is to be performed outside the FPGA, where the performance of these processing steps is facilitated by a second set of logic cells within the FPGA. In one embodiment, the error not correctable by the FPGA itself is due to an MCU. In one embodiment, in the event the error is correctable by the FPGA itself, the correctable error is fixed.

In one embodiment, a plurality of storage elements (208) is coupled to the FPGA (204), wherein the storage elements include at least one of the following: NAND flash cells, NOR flash cells, NVRAM cells, DRAM, SRAM, magnetic storage platters, and optical storage platters. In one embodiment, the set of processing steps includes controller access between a computer bus (114) and the plurality of storage elements (208). In one embodiment, the computer bus (114) includes at least one of the following: Peripheral Connect Interface Express (PCIe) bus, Non-Volatile Memory Express (NVMe) bus, Serial AT Attachment (SATA) bus, Serial Attached SCSI (SAS) bus, and Small Computer Systems Interface (SCSI) bus. In one embodiment, the second set of logic cells is more robust than the first set of logic cells, for example the second set of logic cells has been field-programmable hardened, such as locking the second set of logic cells from being able to be further field programmable.

In 604, the server identifies an error location associated with the error. In one embodiment, identifying an error location associated with the error includes determining a signature for a plurality of submodules, wherein the signature can be verified using a parity check, a CRC check, an ECC syndrome check, or the like.

In 606, in the event that the error location is deemed to have occurred in a critical subset of the first set of logic cells, control is passed to 608. In one embodiment, a critical subset of the first set of logic cells includes cells in use and without redundancy, or with redundant logic that itself has been compromised. In one embodiment, in the event that the error location is deemed to have occurred in logic cells not in use, the server ignores the error. In one embodiment, in the event that the error location is deemed to have occurred in logic cells in use and with redundancy, the server reconfigures at least one of the first set of logic cells, while the FPGA continues to operate in the first mode.

In 608, the server switches the FPGA to operate in the second mode. In one embodiment, the set of processing steps in the second mode is to be performed outside the FPGA by at least one of the following: the processor, a CPU, a GPU, and a peer FPGA. In one embodiment, the peer FPGA is identically configured as the FPGA.

In one embodiment, the set of processing steps includes controller access steps for a plurality of storage elements (208) using at least one of the following specifications: ONFI and Toggle. In one embodiment, the second mode comprises a direct mode permitting SSD controller access steps for the plurality of storage elements, but to be performed outside the FPGA while the FPGA is being reconfigured. In 610, the server reconfigures at least one of the first set of logic cells. In 612, upon successful reconfiguration, the server switches the FPGA to operate in the first mode.

Joint hardware-software assistance for multi-cell upset to provide online recovery of critical devices (120*a*) includes:
- Techniques, for example, using parity signatures to locate the MCU within a PCIe SSD's FPGA (204) logic fabric (404), and responding to such determined location;
- FPGA (204) mode switching between Normal Mode (434) and Direct Mode (432), and the online self-recovery from NOR flash (206);
- Service migration from FPGA pipeline (404) to an external source such as CPU (102), GPU (118), and peer device (120*b*) to support seamless and/or non-interrupted service operation dynamically;
- Management software to manipulate the hardware switching and resource borrowing;
- Predictive HDL development of the high-risk modules in the FPGA (204) as a redundant design to support greater resilience for MCU given the techniques to locate MCUs; and
- Providing external data flow of a peer device (120*b*) to divert its resources and organize the data stream for processing and flow back to the MCU affected device (120*a*).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a field programmable gate array (FPGA) configurable to operate in a first mode in which a set of processing steps is to be performed by a first set of logic cells within the FPGA, or in a second mode in which at least a portion of the set of processing steps is to be performed outside the FPGA, wherein the performance of at least the portion of the set of processing steps outside the FPGA is facilitated using a second set of logic cells within the FPGA; and
   a processor coupled to the FPGA, configured to:
   detect that an error has occurred on the FPGA while the FPGA is operating in the first mode;
   identify an error location associated with the error; and
   in the event that the error location is deemed to have occurred in a critical subset of the first set of logic cells:
   switch the FPGA to operate in the second mode;
   reconfigure at least one of the first set of logic cells; and
   upon successful reconfiguration, switch the FPGA to operate in the first mode.

2. The system recited in claim 1, further comprising a plurality of storage elements coupled to the FPGA, wherein the storage elements include at least one of the following: NAND flash cells, NOR flash cells, non-volatile random-access memory (NVRAM) cells, DRAM, SRAM, magnetic storage platters, and optical storage platters.

3. The system recited in claim 2, wherein the set of processing steps includes controller access between a computer bus and the plurality of storage elements.

4. The system recited in claim 3, wherein the computer bus includes at least one of the following: a Peripheral Connect Interface Express (PCIe) bus, a Non-Volatile Memory Express (NVMe) bus, a Serial AT Attachment (SATA) bus, a Small Computer Systems Interface (SCSI) bus, and a Serial Attached SCSI (SAS) bus.

5. The system recited in claim 1, wherein the second set of logic cells has been field-programmable hardened.

6. The system recited in claim 5, wherein field-programmable hardening includes freezing the second set of logic cells from being able to be further field programmable.

7. The system recited in claim 1, wherein to identify the error location associated with the error includes checking a signature for a plurality of submodules.

8. The system recited in claim 7, wherein the signature is checked by at least one of the following: a parity check; a cyclic redundancy code (CRC) check; and an error-correcting coding (ECC) syndrome check.

9. The system recited in claim 1, wherein in the event the FPGA is switched to operate in the second mode, the set of processing steps is to be performed outside the FPGA by at least one of the following: the processor, a CPU, a graphics processing unit (GPU), and a peer FPGA.

10. The system recited in claim 9, wherein the peer FPGA is identically configured as the FPGA.

11. The system recited in claim 9, wherein the set of processing steps includes controller access steps for a plurality of storage elements using Open NAND Flash Interface (ONFI), Toggle, or both.

12. The system recited in claim 11, wherein the second mode comprises a direct mode permitting solid state disk (SSD) controller access steps to be performed outside the FPGA upon the plurality of storage elements while the FPGA is being reconfigured.

13. The system recited in claim 1, wherein the error not correctable by the FPGA itself is due to the error being associated with a multi-cell upset (MCU).

14. The system recited in claim 1, wherein the critical subset of the first set of logic cells comprises cells in use and without redundancy.

15. The system recited in claim 14, wherein the processor is further configured to, in the event that the error location is deemed to have occurred in logic cells not in use, ignore the error.

16. The system recited in claim 14, wherein the processor is further configured to, in the event that the error location is deemed to have occurred in logic cells in use and with redundancy, reconfigure at least one of the first set of logic cells while the FPGA continues to operate in the first mode.

17. The system of claim 1, wherein the error is not correctable by the FPGA itself.

18. The system of claim 1, wherein the processor is further configured to, in the event the error is correctable by the FPGA itself, fix the correctable error.

19. The system of claim 1, wherein the system is an SSD.

20. A method, comprising:
    detecting that an error has occurred on an FPGA while the FPGA is operating in a first mode,
    wherein the FPGA is configurable to operate in the first mode in which a set of processing steps is to be performed by a first set of logic cells within the FPGA, or in a second mode in which at least a portion of the set of processing steps is to be performed outside the FPGA, wherein the performance of at least the portion of the set of processing steps outside the FPGA is facilitated by a second set of logic cells within the FPGA;
    switching the FPGA to operate in the second mode; and
    reconfiguring at least one of the first set of logic cells.

21. An SSD that stores data received from a host, the SSD comprising:
    an FPGA configurable to operate in a first mode in which a set of processing steps is to be performed by a first set of logic cells within the FPGA, or in a second mode in which at least a portion of the set of processing steps is to be performed outside the FPGA, wherein the performance of at least the portion of the set of processing steps outside the FPGA is facilitated using a second set of logic cells within the FPGA; and
    a processor coupled to the FPGA, configured to:
    detect that an error has occurred on the FPGA while the FPGA is operating in the first mode;
    identify an error location associated with the error; and
    in the event that the error location is deemed to have occurred in a critical subset of the first set of logic cells:
    switch the FPGA to operate in the second mode;
    reconfigure at least one of the first set of logic cells; and
    upon successful reconfiguration, switch the FPGA to operate in the first mode.

22. The SSD recited in claim 21, wherein in the event the FPGA is switched to operate in the second mode, the set of processing steps is to be performed outside the FPGA by at least one of the following: the processor, a CPU, a GPU, and a peer FPGA.

23. A computer program product, the computer program product being embodied in a non-transitory computer readable medium and comprising computer instructions for:
    detecting that an error has occurred on an FPGA while the FPGA is operating in a first mode;
    wherein the FPGA is configurable to operate in the first mode in which a set of processing steps is to be performed by a first set of logic cells within the FPGA, or in a second mode in which at least a portion of the set of processing steps is to be performed outside the FPGA, wherein the performance of at least the portion of the set of processing steps outside the FPGA is facilitated by a second set of logic cells within the FPGA;
    identifying an error location associated with the error; and
    in the event that the error location is deemed to have occurred in a critical subset of the first set of logic cells:
    switching the FPGA to operate in the second mode;
    reconfiguring at least one of the first set of logic cells; and
    upon successful reconfiguration, switching the FPGA to operate in the first mode.

* * * * *